United States Patent
Yang et al.

(10) Patent No.: US 6,954,367 B2
(45) Date of Patent: *Oct. 11, 2005

(54) SOFT-SWITCHING POWER CONVERTER

(75) Inventors: Ta-yung Yang, Milpitas, CA (US); Jenn-yu G. Lin, Taipei (TW); Chern-Lin Chen, Taipei (TW)

(73) Assignee: System General Corp., Taipei Hsien (TW)

( * ) Notice: Subject to any disclaimer, the term of this patent is extended or adjusted under 35 U.S.C. 154(b) by 39 days.

This patent is subject to a terminal disclaimer.

(21) Appl. No.: 10/248,219

(22) Filed: Dec. 29, 2002

(65) Prior Publication Data

US 2004/0125619 A1 Jul. 1, 2004

(51) Int. Cl.[7] .............................................. H02M 3/24
(52) U.S. Cl. ...................................................... 363/98
(58) Field of Search ............................... 363/17, 56.02, 363/98, 132

(56) References Cited

U.S. PATENT DOCUMENTS

| | | | | |
|---|---|---|---|---|
| 4,864,482 A | * | 9/1989 | Quazi et al. ................. | 363/37 |
| 5,442,540 A | | 8/1995 | Hua et al. .................... | 363/98 |
| 5,715,150 A | * | 2/1998 | Stava .......................... | 363/41 |
| 5,719,754 A | * | 2/1998 | Fraidlin et al. .............. | 363/17 |
| 5,838,558 A | * | 11/1998 | Tan et al. ..................... | 363/91 |
| 5,973,939 A | | 10/1999 | Tan ............................. | 363/21 |
| 6,069,798 A | | 5/2000 | Liu ............................. | 363/16 |
| 6,191,960 B1 | | 2/2001 | Fraidlin et al. .............. | 363/25 |
| 6,356,462 B1 | | 3/2002 | Jang et al. .................... | 363/17 |
| 6,466,458 B2 | * | 10/2002 | Zhang et al. ................. | 363/17 |
| 6,744,649 B1 | * | 6/2004 | Yang et al. ................... | 363/98 |

OTHER PUBLICATIONS

Nilsson et al, Electric Circuits, 1996, Addison–Wesley Publishing, 5th Edition, pp. 506, 507.*

* cited by examiner

Primary Examiner—Gary L. Laxton
(74) Attorney, Agent, or Firm—Jiang Chyun IP Office

(57) ABSTRACT

A pulse width modulated soft-switching power converter has a transformer with a primary winding and a secondary winding, a secondary circuit coupled to the secondary winding, and a pair of main switches and a pair of auxiliary switches coupled to the primary winding. The main switches and auxiliary switches intermittently conduct an input voltage source to the primary winding of the transformer to operate the soft-switching power converter in four operation stages in each switching cycle. The main switches conduct the input voltage source to the transformer in a first operation stage. In a second operation stage, the conduction is cut off. The transformer operates as an inductor with the auxiliary switches switched on under zero-voltage or zero-current switching mode in a third operation stage. In the fourth operation stage, auxiliary switches are switched off to achieve zero-voltage transition.

8 Claims, 8 Drawing Sheets

SOFT-SWITCHING POWER CONVERTER

BACKGROUND OF THE INVENTION

Field of the Invention

The present invention relates in general to a pulse width modulation power converter, and more particularly, to an improved pulse width modulation power converter using zero-voltage switching technique.

Power converters have been used to convert an unregulated power source to a regulated voltage or current source. The transformer that comprises a primary winding and a secondary winding is the heart of most power converters. Typically, a switching device is connected to the primary winding to control energy transferred from the primary winding to the secondary winding and output therefrom. Currently, under the control of the switching device, the pulse width modulated power converter can be operated at a high frequency with reduced size and weight. However, such a power converter suffers from switching loss, component stress, noise, and electromagnetic interference (EMI) issues.

To resolve the switching loss problem of the pulse width modulation power converter, a phase-shift scheme for soft switching has been proposed, particularly for the high-frequency power conversion. For example, the full-bridge (FB) quasi-resonant zero-voltage switching (ZVS) technique has been disclosed in U.S. Pat. No. 4,855,888, "Constant frequency resonant power converter with zero-voltage switching" issued to Christopher P. Henze, Ned Mohan and John G. Hayes on Aug. 8, 1989, U.S. Pat. No. 5,442,540, "Soft-switching PWM converters" issued to Guichao C Hua and Fred C. Lee on Aug. 15, 1995, and U.S. Pat. No. 6,356,462 "Soft-switched full-bridge converters" disclosed by Yungtaek Jang and Milan M. Jovanovic on Mar. 12, 2002. In U.S. Pat. No. 5,973,939, "Double forward converter with soft-PWM switching" issued to F. Don Tan on Oct. 26, 1999 and U.S. Pat. No. 6,191,960, "Active clamp for isolated power converter and method of operating thereof" issued to Simon Fraidlin and Anatoliy Polikarpov on Feb. 20, 2001. The active clamp technique has been employed in the forward zero-voltage switching power converters. In U.S. Pat. No. 6,069,798, "Asymmetrical power converter and method of operation thereof" issued to Rui Liu on May 30, 2000, an asymmetrical scheme has been developed for a half-bridge (HB) topology.

Among various zero-voltage switching power converters, a parasitic leakage inductor of the transformer or at least one additional magnetic component is used to be a resonant inductor or switch to generate a circulating current, so as to achieve the zero-voltage transition and switching. The parasitic leakage inductor of the transformer or the additional magnetic component, though aiding zero-voltage transition and switching, inevitably increases switching stress and noise. Further, in such an approach, power consumption caused by the circulating current is significantly high in the light load or zero-load condition.

SUMMARY OF THE INVENTION

The present invention provides a pulse width modulated soft-switching power converter for high frequency operation. The pulse width modulated soft-switching power converter is operated at a constant frequency with low switching loss, low stress, and low noise.

The present invention further provides a pulse width modulated soft-switching power converter that can generate zero-voltage transition and switching without using an additional magnetic device or leakage inductor of the transformer.

The present invention also provides a pulse width modulated soft-switching power converter that consumes relatively low power in light load and zero-load conditions.

Further, the present invention provides a control scheme to optimize soft switching of a power converter.

The pulse width modulated soft-switching power converter provided by the present invention comprises a transformer, a secondary circuit, a pair of main switches and a pair of auxiliary switches. The transformer has a primary winding coupled to the main and auxiliary switches and a secondary winding coupled to the secondary circuit. The main switches and auxiliary switches intermittently conduct an input voltage source to the primary winding of the transformer, such that the soft-switching power converter is operated in four operation stages in each switching cycle.

In the first operation stage, the connection of the transformer and the input voltage source is established by switching on main switches, such that power is delivered from the primary winding to the secondary winding. In the second operation stage, the connection between the input voltage source and the transformer established by main switches is cut off, such that energy stored in the transformer is reset and freewheeled back to the input voltage source through auxiliary switches. Meanwhile, energy stored in the secondary circuit is continuously output therefrom. In the third operation stage, the transformer operates as an inductor with the secondary winding thereof open circuited. Auxiliary switches are thus switched under a zero-current switching mode. In the fourth stage, energy stored in and magnetizing the transformer in the third operation stage flies back to the input voltage source through main switches to achieve a zero-voltage transition.

In the above pulse width modulated soft-switching power converter, main switches and auxiliary switches are driven by a first switching signal and a second switching signal, respectively. The first and second switching signals are preferably in the form of pulse signals with a first pulse width and a second pulse width, respectively. Preferably, the first pulse width is broader than the second pulse width. In such manner, in each switching cycle, main switches are switched on only in the first operation stage, and auxiliary switches are switched on only in the third operation stage. In the second and fourth operation stages, both main switches and auxiliary switches are switched off.

In the above pulse width modulated soft-switching power converter, the duration of the second operation stage can be extended, allowing energy stored in the transformer to be completely released. The energy stored in the transformer in the third operation stage is equal to the multiplication of the square of the input voltage and the square of the duration of the third operation stage divided by 2 times inductance of the primary winding. In order to achieve zero-voltage transition in the fourth operation stage, energy stored in the transformer in the third stage is no less than energy needed for charging parasitic capacitors of main switches. Further, a minimum duration of the fourth operation stage is required to achieve zero-voltage transition. The minimum duration of the fourth operation stage, also referred as a minimum transfer time, is proportional to the inductance of the primary winding and inversely proportional to the parasitic capacitance of main switches. Moreover, the fourth operation stage may be delayed by a delay time for switching on parasitic diodes of main switches, allowing energy stored in the transformer to flow back to the input voltage source, so as to achieve zero-voltage transition. Therefore, energy stored in the third operation stage is no less than the sum of energy needed for charging the parasitic capacitors of main switches and the energy needed during the delay time.

The pulse width modulated soft-switching power converter provided by the present invention further comprises a controller to generate the first switching signal and the second switching signal for driving main switches and auxiliary switches, respectively. By the controller, a pulse width modulation switching frequency is determined. The pulse width modulated soft-switching power converter further comprises a first resistor coupled to the controller to adjust a pulse width modulation switching frequency. The pulse width modulated soft-switching power converter further comprises a second resistor coupled to the controller to adjust a pulse width of the second switching signal. The pulse width modulated soft-switching power converter further comprises a third resistor coupled to the controller to adjust a pulse width of the second switching signal as a function of a load of the power converter.

BRIEF DESCRIPTION OF ACCOMPANIED DRAWINGS

The accompanying drawings are included to provide a further understanding of the present invention, and are incorporated in and constitute a part of this specification. The drawings illustrate embodiments of the present invention and, together with the description, serve to explain the principles of the present invention. In the drawings, FIG. 1 is a circuit diagram of a soft-switching power converter according to the present invention;

DESCRIPTION OF THE PREFERRED EMBODIMENT

Figure 1:
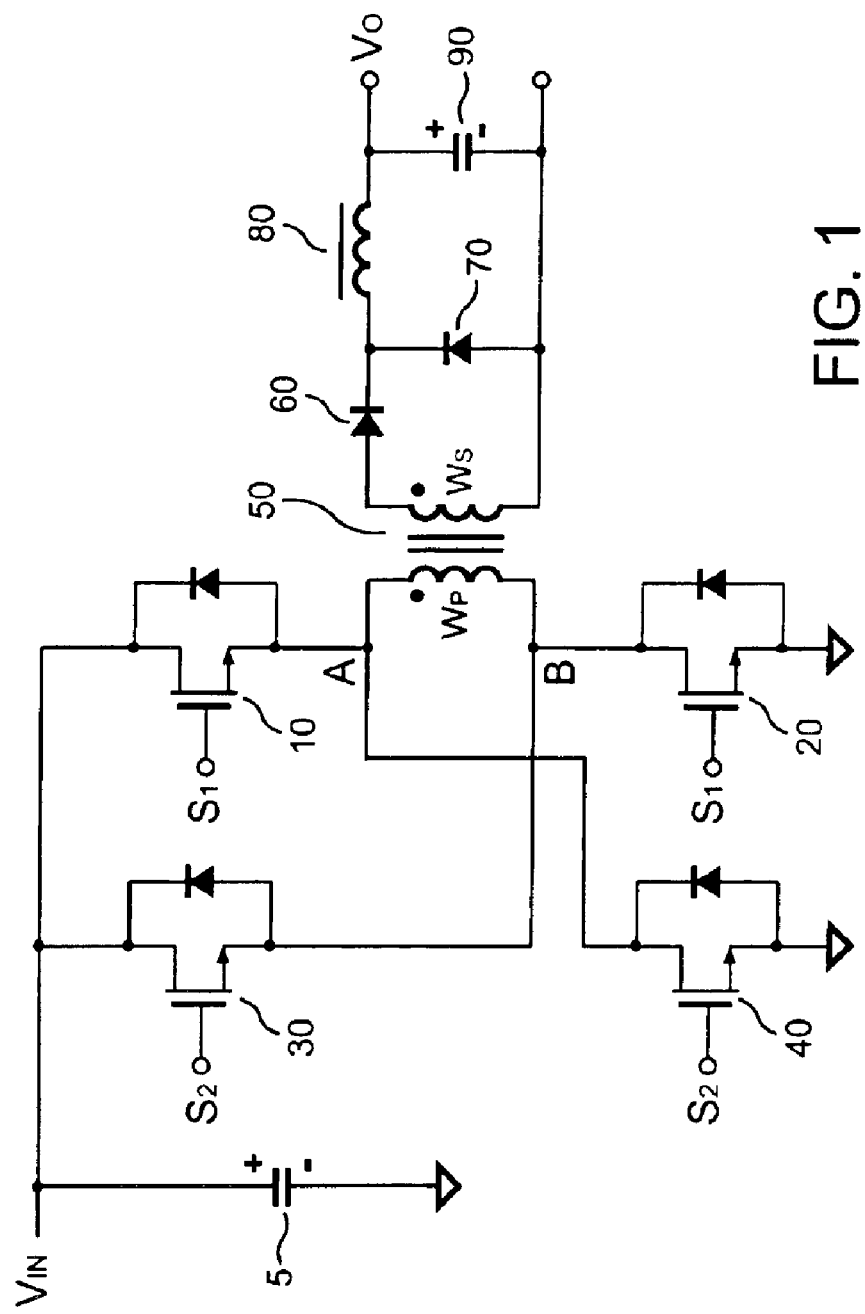

FIG. 1 shows the topology of a soft-switching power converter provided by the present invention. As shown in FIG. 1, the soft-switching power converter comprises a transformer 50, a pair of main switches 10 and 20, a pair of auxiliary switches 30 and 40, and a secondary circuit. The transformer 50 further comprises a primary winding Wp coupled to main switches 10, 20 and auxiliary switches 30, 40 and a secondary winding Ws coupled to the secondary circuit. More specifically, in this embodiment, the main switch 10 connects the primary winding Wp to an input voltage source $V_{IN}$ at a first end A thereof, which is further connected to the auxiliary switch 40. The auxiliary switch 30 connects the input voltage source $V_{IN}$ to a second end B of the primary winding Wp, and the second end B, is further connected to the main switch 20. The main switches 10, 20 and auxiliary switches 30, 40 can be metal-oxide semiconductor field effect transistors (MOSFET), insulated gate bipolar transistors (IGBT), or gate-turn-off transistors (GTO), for example. As shown in FIG. 1, the input voltage source $V_{IN}$ is further connected to a capacitor 5.

The secondary circuit comprises a half-bridge rectifier, which is assembled of a diode 60 that is often referred as the rectifying diode and a freewheel diode 70, an inductor 80, an output capacitor 90, and an output terminal for outputting an output voltage $V_O$. An anode of the diode 60 is coupled to a first end of the secondary winding Ws, and an anode of the freewheel diode 70 is coupled to a second end of the second winding Ws. The inductor 80 is connected between a cathode of the diode 60 and a cathode of the freewheel diode 70 and the output terminal of the secondary circuit. The output capacitor 90 has a negative terminal connected to the anode of the freewheel diode 70 and a positive terminal connected to the inductor 80 and the output terminal of the secondary circuit.

Figure 2:
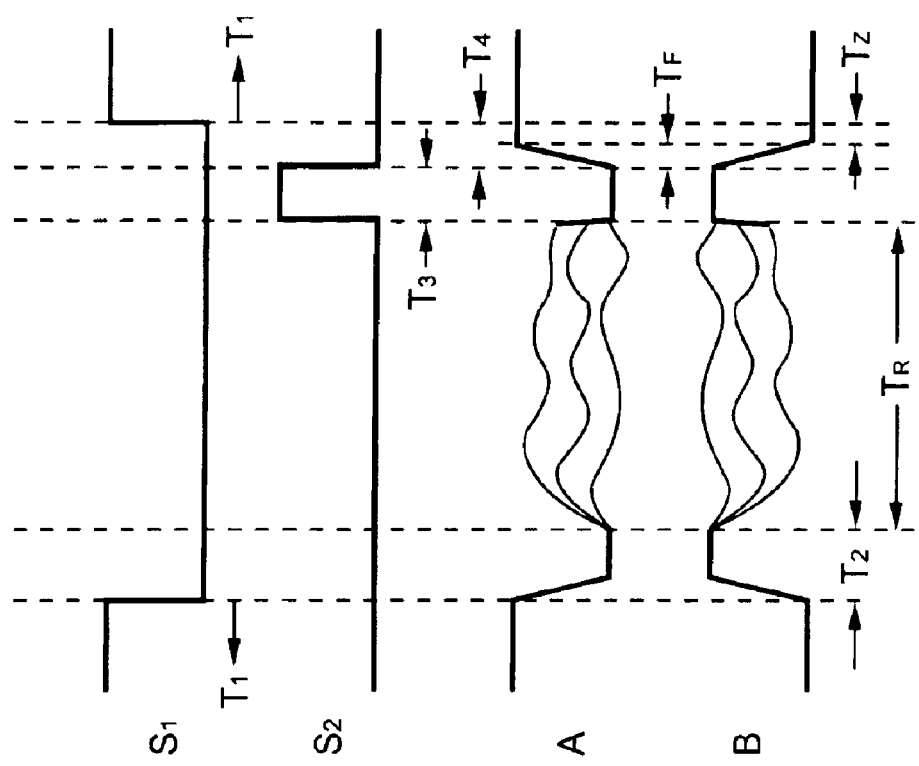
FIG. 2 shows waveforms in various operation stages of each switching cycle of the soft-switching power converter as shown in FIG. 1.

As shown in FIG. 1, main switches 10 and 20 are driven by a switching signal $S_1$, while auxiliary switches 30 and 40 are driven by a switching signal $S_2$. Referring to FIG. 2, the switching signal $S_1$ preferably is in a pulse waveform with a pulse width of a duration $T_1$, while the switching signal $S_2$ is preferably in a pulse waveform with a pulse width of a duration $T_3$.

By controlling the on/off status of main switches 10, 20 and auxiliary switches 30, 40, the power converter as shown in FIG. 1 has four operation stages in each switching cycle as shown in FIGS. 3a to 3d. In order to operate the soft-switching power converter in four operation stages, the switching signals $S_1$ and $S_2$ are out of phase. That is, in the embodiment as shown in FIG. 1 and FIG. 2, main switches 10 and 20 are turned on when the switching signal $S_1$ is high within the duration $T_1$ for each switching cycle. During the duration $T_1$, auxiliary switches 30 and 40 are in an off state. When the switching signal $S_1$ is low for a duration $T_2$, as shown in FIG. 2, auxiliary switches 30 and 40 are turned on within duration $T_3$.

Figure 3A:
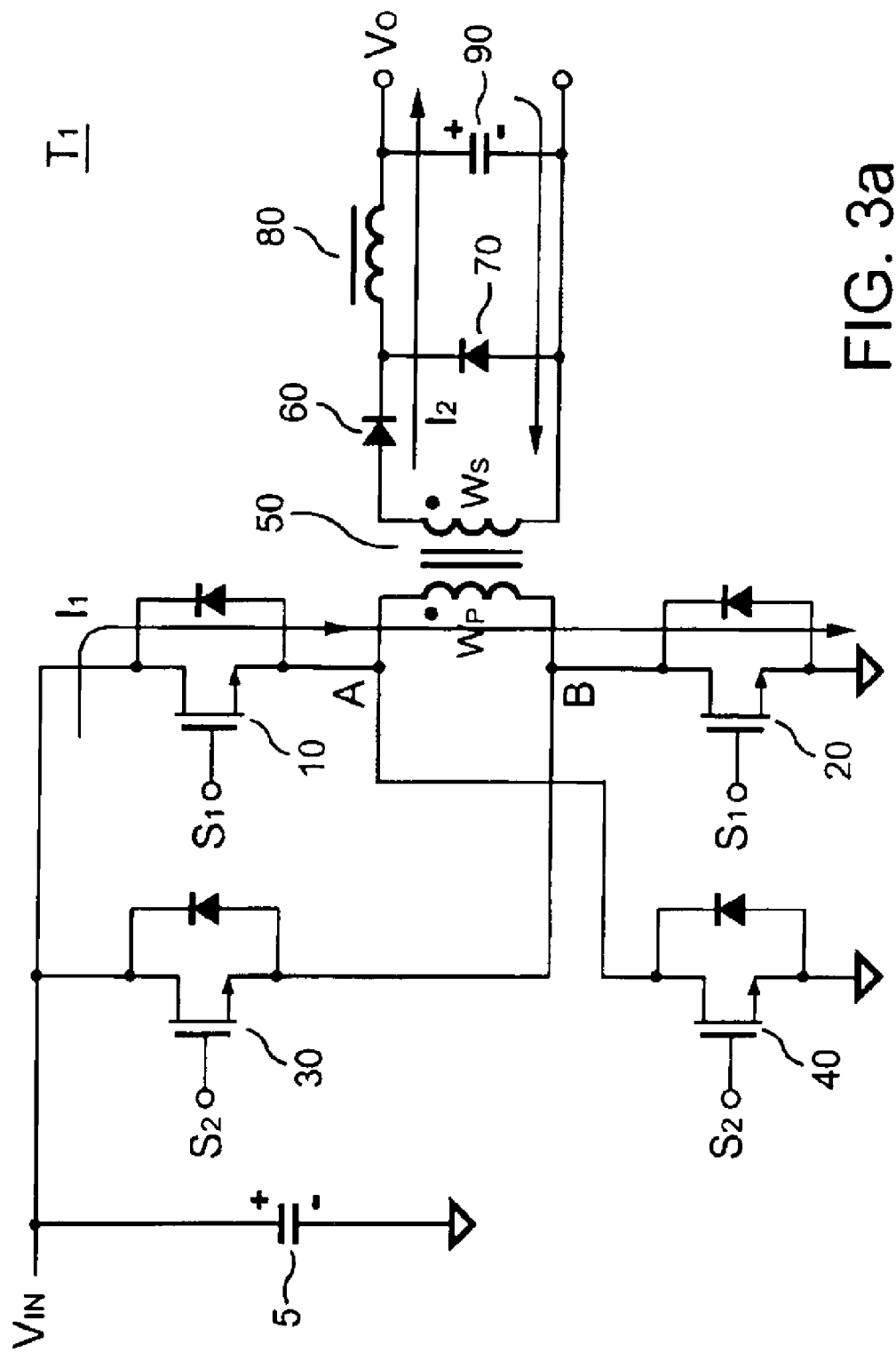
FIG. 3a shows the current flow of the soft-switching power converter as shown in FIG. 1 in a first operation stage of one switching cycle.

The four operation stages are further described as follows with reference to FIGS. 2 and 3a to 3d. At the beginning of each switching cycle, as shown in FIG. 2, main switches 10 and 20 are switched on within the duration $T_1$ of the switching signal $S_1$. As main switches 10 and 20 are turned on, as shown in FIG. 3a, the current $I_1$, flows from the input voltage source $V_{IN}$ through main switches 10 and 20 across the primary winding Wp. Therefore, the input voltage source $V_{IN}$ is applied to the primary winding Wp. The polarities of the primary winding Wp and the secondary winding Ws conduct the diode 60 by supplying a forward bias thereto. Meanwhile, the freewheel diode 70 is reversely biased. Therefore, a secondary current $I_2$ flows through the diode 60 and the inductor 80 along the arrow as shown in the secondary circuit of FIG. 3a. Consequently, energy is delivered to the output terminal of the pulse width modulated soft-switching power converter to generate an output voltage $V_O$.

Figure 3B:
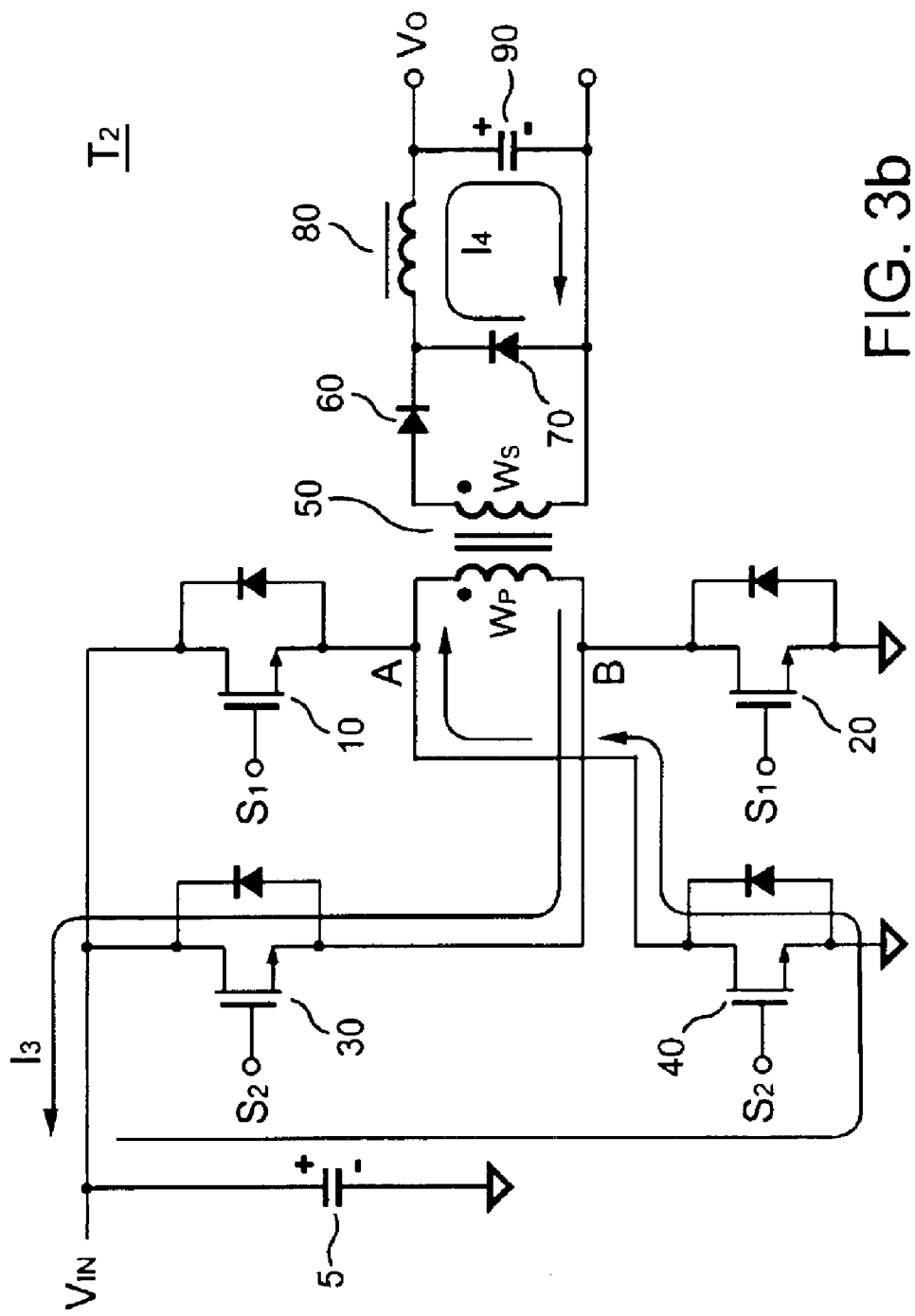
FIG. 3b shows the current flow of the soft-switching power converter as shown in FIG. 1 in a second operation stage of one switching cycle.

After the duration $T_1$, the switching signal $S_1$ drops to zero or a lower voltage to switch off main switches 10 and 20 in the second operation stage as shown in FIG. 2. Referring to FIG. 2 and FIG. 3b, the current $I_1$ is cut off.

However, before auxiliary switches 30 and 40 are switched on by the switching signal $S_2$ within the duration $T_3$, the energy that stored in the primary winding Wp produces a current that inverts the polarity of the primary winding Wp and the secondary winding Ws and induces a current $I_3$ flowing back to the input voltage source $V_{IN}$. As a result, the diode 60 connected to the secondary winding Ws is reversely biased, and the secondary winding Ws become an open circuit. Therefore, the energy stored in the transformer 50 (primarily generated by leakage inductance of the transformer 50) is reset and freewheeled back to the input voltage source $V_{IN}$ with the current $I_3$ flowing through the parasitic diodes of auxiliary switches 30 and 40. Meanwhile, the freewheel diode 70 is forwardly biased and conducted to form a closed loop between the freewheel diode 70, the inductor 80, and the output capacitor 90 with a current $I_4$ circulating therethrough. Therefore, the energy stored in the inductor 80 and the output capacitor 90 is thus continuously delivered to the output terminal of the secondary circuit. Further, as shown in FIG. 2, the duration $T_2$ of the second operation stage is varied according to the amount of energy stored in the transformer 50. The variable duration of the second operation stage is denoted as $T_R$ in FIG. 2.

Figure 3C:
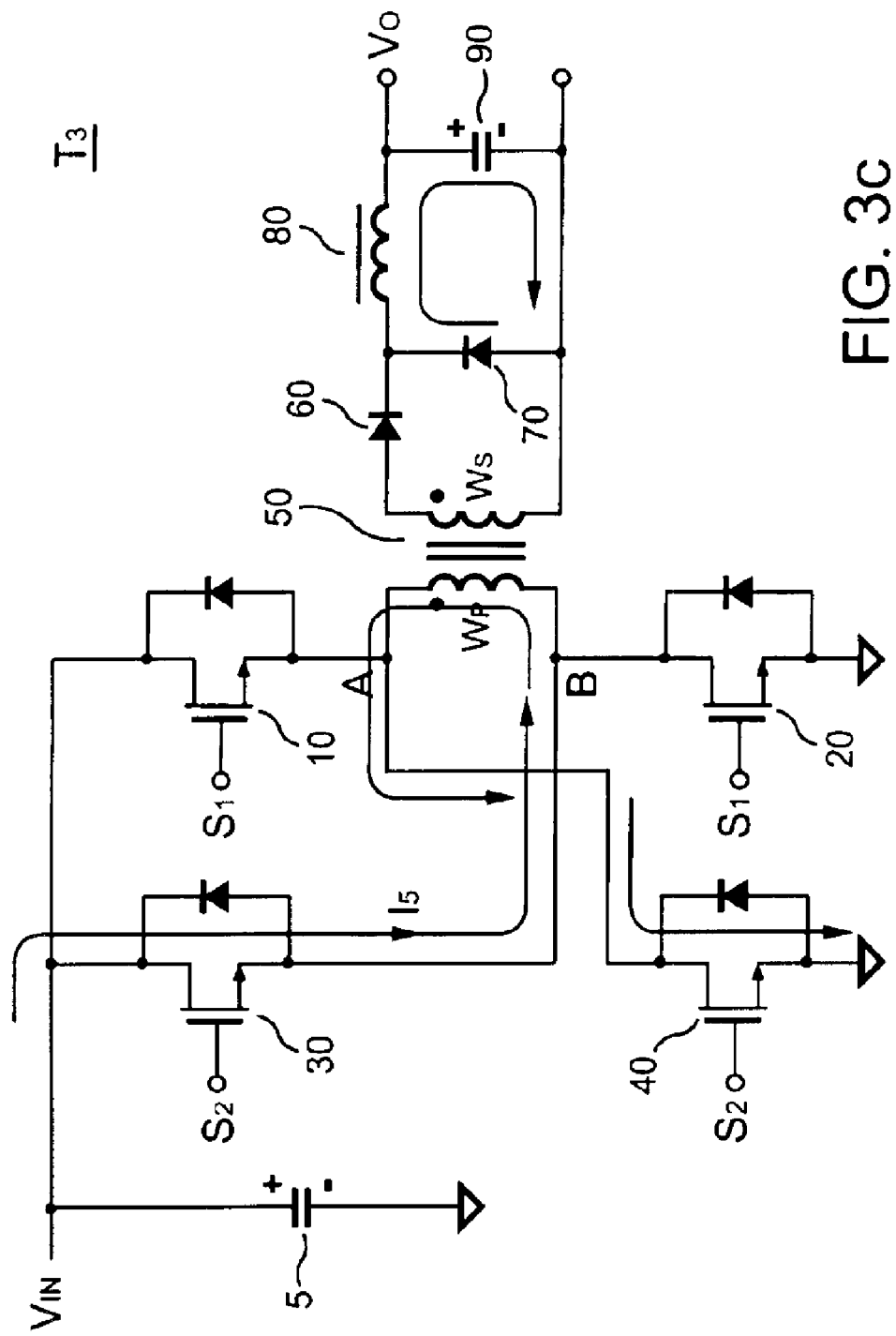
FIG. 3c shows the current flow of the soft-switching power converter as shown in FIG. 1 in a third operation stage of one switching cycle.

FIGS. 2 and 3c show the third operation stage in each switching cycle of the pulse width modulated soft-switching power converter. As shown in FIG. 2, before the next switching cycle, that is, before the main switches 10 and 20 are switched on by the pulse of the switching signal $S_1$ again, the switching signal $S_2$ switches on the auxiliary switches 30 and 40 within the duration $T_3$ thereof. As shown in FIG. 3c, by switching on the auxiliary switches 30 and 40, the input voltage source $V_{IN}$ is connected to the second end B of the primary winding Wp to induce a current $I_5$ across the primary winding Wp and directed along at the side of the primary winding Wp, and energy is stored in the transformer 50. Similar to the second operation stage, polarity of the transformer 50 results in reverse bias of the diode 60, so that the secondary winding Ws becomes open circuited. The transformer 50 thus operates as an inductor in the third operation stage, such that the power converter is operated similar to a discontinuous mode flyback power converter. Switching on the auxiliary switches 30 and 40 under zero-current switching (ZCS) or zero-voltage switching (ZVS) can thus be realized. The energy stored in the transformer 50 in the third operation stage can be expressed as:

$$\epsilon = Lp \times Ip^2/2,$$

where Lp is the inductance of the primary winding Wp, Ip is the current flowing through the primary winding Wp and can be expressed as:

$$Ip = V_{IN} \times T_3/Lp,$$

where $T_3$ is the duration that auxiliary switches 30 and 40 are turned on, that is, the pulse width of the switching signal $S_2$. By substituting the equation of Ip into the equation of the energy $\epsilon$, $$\epsilon = V_{IN}^2 \times T_3^2/(2 \times Lp).$$

Therefore, the energy stored in the transformer 50 in the third operation stage is proportional to the multiplication of the square of the input voltage $V_{IN}$ and the square of the pulse width $T_3$ of the switching signal $S_2$, and inversely proportional to the inductance of the primary winding Wp.

Figure 3D:
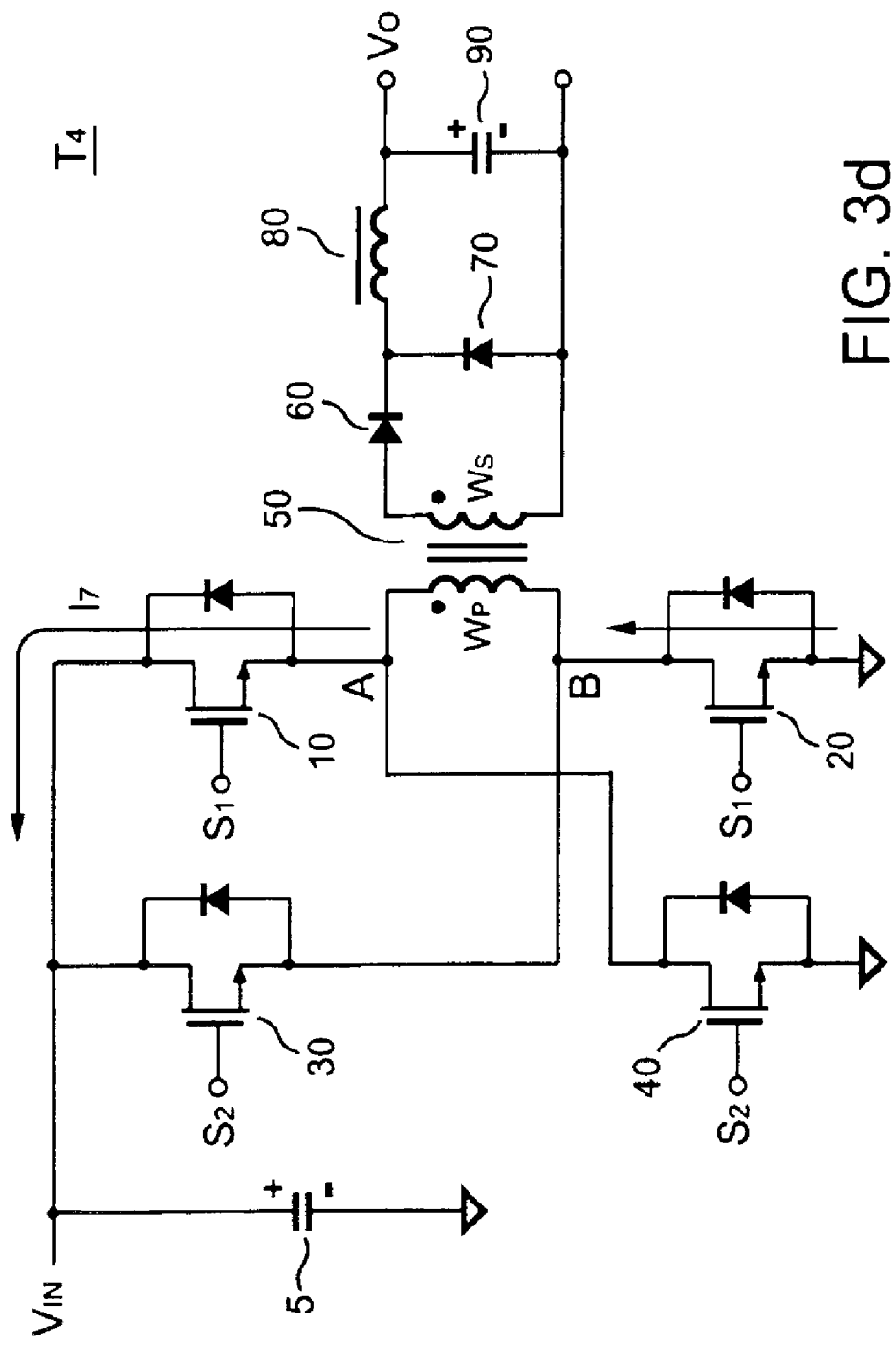
FIG. 3d shows the current flow of the soft-switching power converter as shown in FIG. 1 in a fourth operation stage of one switching cycle.

In the fourth operation stage as shown in FIG. 2 and FIG. 3d, the switching signal $S_2$ drops to zero or lower to switch off auxiliary switches 30 and 40, while the switching signal $S_1$ stays zero or lower to keep the main switches 10 and 20 turned off. The current $I_5$ produced in the third operation stage flows through the primary winding Wp. Meanwhile, the energy stored in the transformer 50 during the period $T_3$ of the third operation stage flies back to the input voltage source $V_{IN}$ through the parasitic diodes of main switches 10 and 20 to achieve zero-voltage transition.

To turn on the parasitic diodes of main switches 10 and 20, the parasitic capacitors of main switches 10 and 20 have to be discharged in advance. In other words, zero-voltage transition is achieved when the parasitic capacitors of the main switches 10 and 20 have been discharged. Therefore, to achieve zero-voltage transition, the energy stored in the transformer 50 in the third operation stage must be larger than the energy needed to discharge both of the parasitic capacitors of main switches 10 and 20. The relation can be expressed by the following inequality:

$$V_{IN}^2 \times T_3^2/(2 \times Lp) > 2 \times (Cr \times V_{IN}^2/2)$$

Where Cr is the parasitic capacitance of the main switch 10 or 20. As the resonant frequency fr between the primary winding Wp and the parasitic capacitors of main switches 10 and 20 at the period $T_3$ can be expressed as:

$$fr = 1/(2\pi \times (Lp \times Cr)^{1/2}),$$

a minimum transfer time $T_F$ to achieve phase shift for zero-voltage transition can be expressed as:

$$T_F = 1/(4 \times fr) = \pi \times (Lp \times Cr)^{1/2}/2.$$

That is, the minimum time from the switching signal $S_2$ dropping to low to switch off auxiliary switches 30 and 40 to the time the main switches 10 and 20 being switched on again by the duration $T_1$ of switching signal $S_1$, namely, the minimum duration of the fourth stage can be calculated by the above equation of $T_F$. >From the above equation, it is known that the minimum time required for achieving zero-voltage transition is determined by the inductance of the primary winding Wp and the parasitic capacitance Cr.

The duration of the fourth stage may be delayed by a delay time $T_Z$ after the parasitic diodes of main switches 10 and 20 are conducted and before the next switching cycle starts. Therefore, the total duration of the fourth stage is the sum of the minimum transfer time $T_F$ and the delay time $T_Z$, that is, $T_4 = T_F + T_Z$. However, in order to operate the inductor 80 in a continuous mode under the condition of zero-voltage transition, the energy stored in the transformer 50 in the duration $T_3$ of the third operation stage must satisfy the following inequality:

$$V_{IN}^2 \times T_3^2/(2 \times Lp) > \{[Cr \times V_{IN}^2] + [V_{IN} \times (Ts/Tp) \times I_O \times T_Z] + [T_Z \times V_{IN}^2 \times T_3/Lp]\},$$

where Ts and Tp are turn numbers of the secondary and primary windings Ns and Np, respectively, and $I_O$ is the output current of the power converter. That is, the energy stored in the transformer 50 in the duration $T_3$ must be large enough to discharge the parasitic capacitance 2Cr, and then provide the primary side backward freewheeling current and sustain the output current during the delay time $T_Z$.

Figure 4:
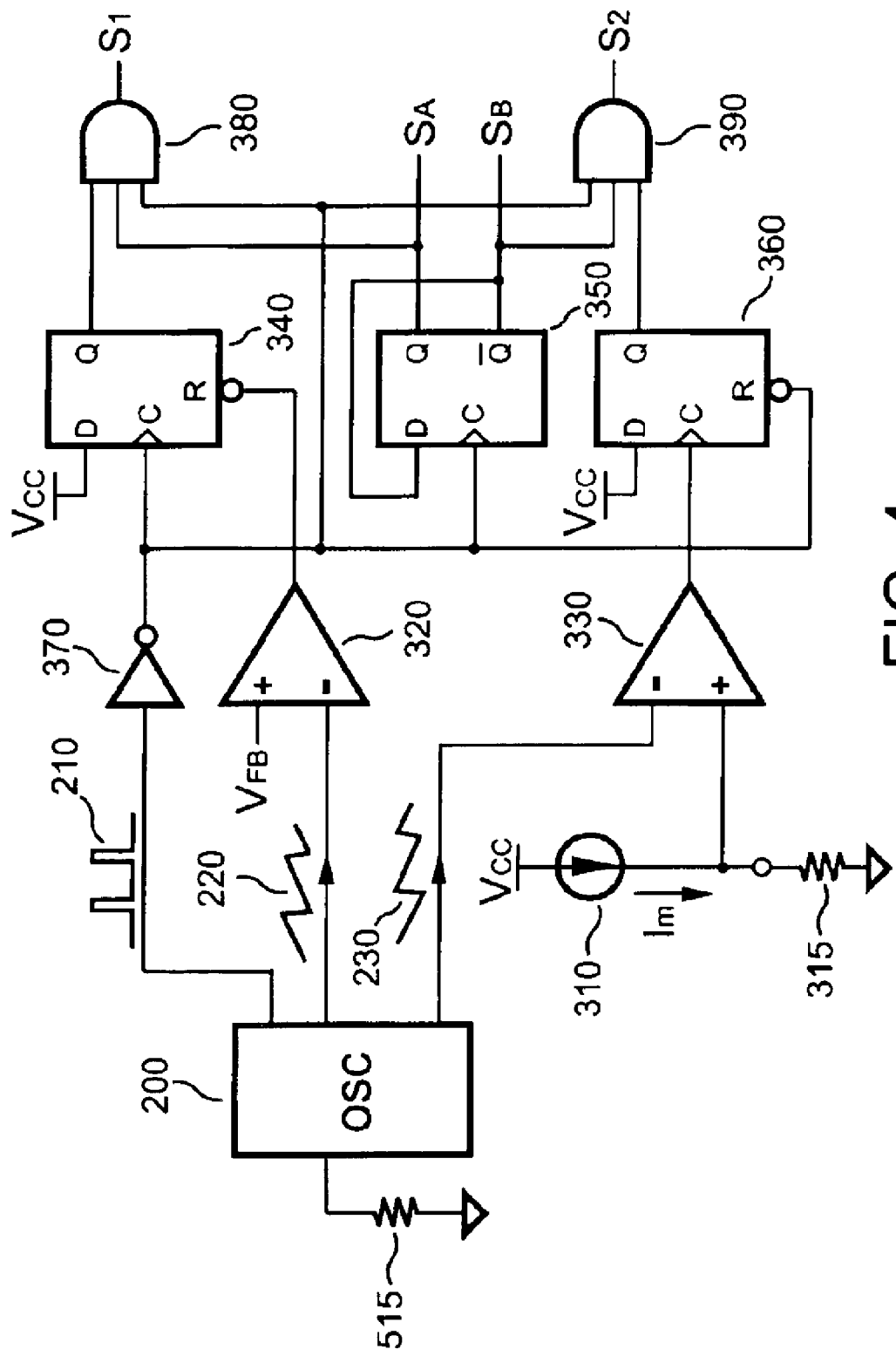
FIG. 4 shows a circuit that generates switching signals for controlling main switches and auxiliary switches of the soft-switching power converter as shown in FIG. 1.

FIG. 4 shows a circuit diagram of the controller, which generates switching signals $S_1$ and $S_2$. As shown in FIG. 4, the controller includes an oscillator 200, an inverter 370, comparators 320 and 330, a programmable current source 310, D-type flip-flops 340, 350 and 360, and AND gates 380 and 390. The oscillator 200 is coupled to an input of the inverter 370, the negative inputs of the comparators 320 and 330, and a reference resistor 515. An output of the inverter 370 is coupled to the D-type flip-flops 340, 350, 360, and the inputs of the AND gates 380 and 390. The D-type flip-flop 340 is further coupled to a voltage source Vcc and the output of the comparator 320, while an output thereof is coupled to the AND gate 380. Signals $S_A$ and $S_B$ output by the D-type flip-flop 350 are inverted from each other and fed into the AND gates 380 and 390, respectively. Signal $S_B$ is fed to the D-type flip-flop 350. The D-type flip-flop 360 is further coupled to the output of the comparator 330 and the voltage source Vcc, while an output thereof is coupled to the input of the AND gate 390. From the AND gates 380 and 390, the switching signals $S_1$ and $S_2$ are output to drive the main switches 10, 20 and the auxiliary switches 30, 40, respectively.

As shown in FIG. 4, the D-type flip-flop 350 provides signals $S_A$ and $S_B$ to the AND gates 380 and 390, respectively. The main switches 10, 20 and the auxiliary switches 30 and 40 as shown in FIG. 1 are driven out of phase with slightly less than 50% of the maximum duty cycle. The oscillator 200 is operative to generate a clock signal 210, a ramp signal 220 and a saw signal 230. The clock signal 210 is input to the inverter 370 to determine the switching frequency. A feedback voltage $V_{FB}$ reflecting the output voltage of the power converter is compared to the ramp signal 220 in the comparator 320. When the feedback voltage $V_{FB}$ is high, the duration $T_1$ of the switching signal $S_1$ is broadened, and more power is forwarded to the output of the power converter. Therefore, the feedback voltage $V_{FB}$ sourced from the output voltage $V_O$ of the power converter is used to regulate the output voltage $V_O$. The oscillator 200 further generates a saw signal 230 that is synchronized with the ramp signal 220. The amplitude of the saw signal 230 is inversely proportional to that of the ramp signal 220. The programmable current source 310 generates a programmable current Im as a function of the feedback voltage $V_{FB}$. The programmable current Im flows through a resistor 315, and thus results in a programmable voltage across the resistor 315. The saw signal 230 is compared to the programmable voltage in the comparator 330. By adjusting the programmable current Im, the programmable voltage across the resistor 315 is programmed, such that the duration $T_3$ of the switching signal $S_2$ can be programmed or adjusted. When the programmable current Im is increased, the duration $T_3$ of the switching signal $S_2$ is broadened and zero voltage switching can be achieved.

Figure 5:
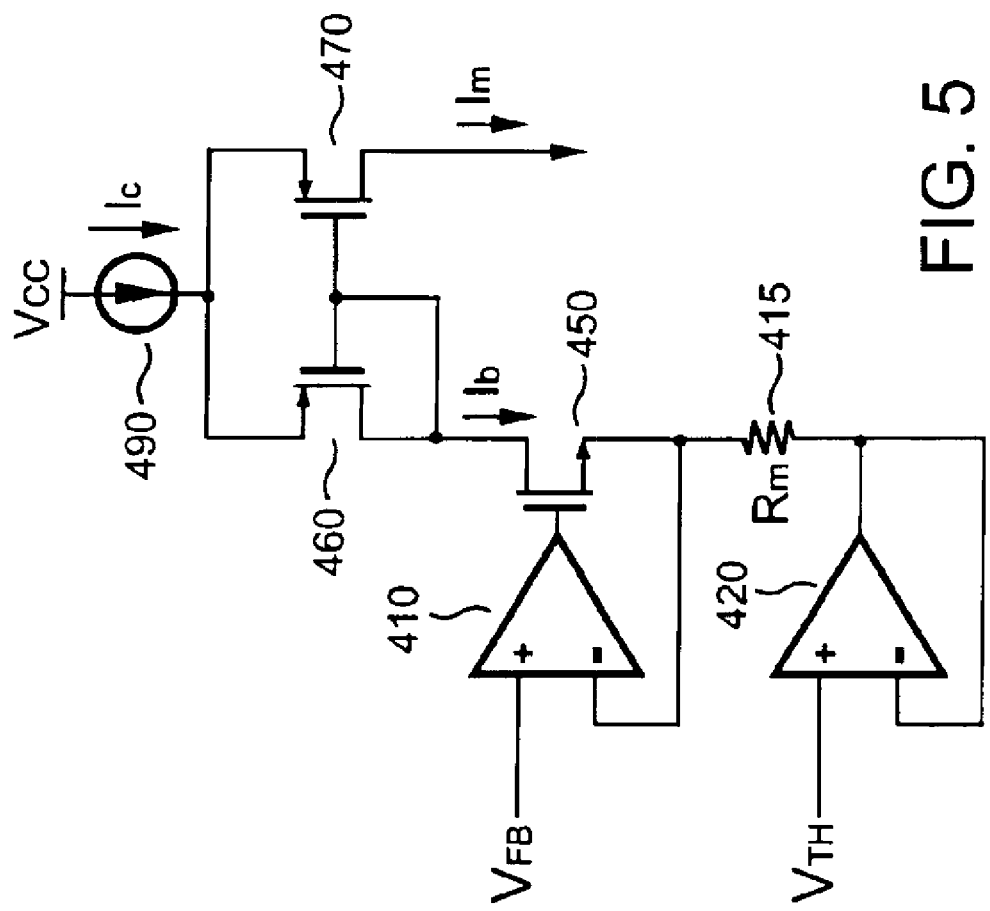
FIG. 5 shows a circuit for generating a programmable current supplied to the circuit as shown in FIG. 4.

FIG. 5 shows the circuit of the programmable current source 310. As shown in FIG. 5, the programmable current source 310 includes a current source 490, a pair of mirrored transistors 460 and 470, another transistor 450, op-amplifiers 410 and 420 and a programmable resistor 415. The current source 490 is connected to the voltage source $V_{CC}$ to provide a constant source current. In the programmable current source 310, the programmable current Im can be expressed as:

$$Im=K\times(V_{FB}-V_{TH})/Rm,$$

where $$0 \leq Im \leq Imax.$$

In the above equation and inequality of the programmable current Im, Rm is the resistance of the programmable resistor 415, K is the mirror ratio of the mirrored transistor 460 and 470, Imax=Ic−Ib, where Ic is the current of the constant current source 490, and Ib is the current flowing through the transistor 450. The programmable resistor 415 determines the variation range programmed by the feedback voltage $V_{FB}$. The duration $T_3$ of the switching signal $S_2$ becomes narrower or even turned off when the feedback $V_{FB}$ is reduced, that is, when the load coupled to the output of the power converter is decreased. Therefore, no circulated power is consumed, and power consumption in the light load condition is reduced.

In the topology of the pulse width modulated soft-switching power converter provided by the present invention, the main switches 10, 20 and the auxiliary switches 30, 40 are activated with zero voltage switching and zero current switching operations, respectively. Compared to the conventional pulse width modulation power converter, the switching loss is greatly reduced. Further, the present invention does not require an additional magnetic device or leakage inductance of the transformer, such that the switching loss, stress and noise are reduced. In addition, the power consumption under light load condition is reduced.

While the present invention has been particularly shown and described with reference to preferred embodiments thereof, it will be understood by those of ordinary skill in the art that various changes in form and details may be made therein without departing from the spirit and scope of the present invention as defined by the appended claims.

What is claimed is:

1. A pulse width modulated soft-switching power converter, comprising a transformer, a secondary circuit, a first diode, a second diode, an inductor, a capacitor, a pair of main switches, a pair of auxiliary switches, and a controller, characterized in that said controller generates a first switching signal and a second switching signal to operate said pulse with modulated soft-switching power converter in four operation stages, wherein:

power is delivered from said primary winding to said secondary winding in a first operation stage for each switching cycle, wherein said main switches being switched on and said auxiliary switches being switched off in said first operation stage;

energy stored in said transformer is reset and freewheeled back to said input voltage source through said auxiliary switches, and energy stored in said secondary circuit is continuously output in a second operation stage for each switching cycle, wherein said main switches being switched off and said auxiliary switches remaining off in said second operation stage, and a time period of said second operation stage being variable according to an energy stored in said transformer;

said transformer operates as an inductor with said secondary winding open circuited, so as to realize a zero-current switching mode of said auxiliary switches in a third operation stage for each switch cycle, wherein said main switches remaining off and said auxiliary switches being switched on in said third operation stage; and energy stored in and magnetizing said transformer in said third operation stage flies back to said input voltage source through said main switches to achieve a zero-voltage transition in a four operation stage for each switching cycle, wherein said main switches remaining off and said auxiliary switches being switched off in said fourth operation stage.

2. The pulse width modulated soft-switching power converter as recited in claim 1, wherein said controller comprises:

an oscillator, operative to generate a clock signal, a ramp signal and a saw signal;

an inverter, having an input terminal receiving said clock signal and an output terminal;

a first comparator, having a positive terminal supplied with a feedback voltage obtained from said secondary circuit, a negative terminal supplied with said ramp signal, and an output terminal;

a second comparator, having a positive terminal, a negative terminal and an output terminal, wherein said negative terminal of said second comparator is supplied with said saw signal, wherein said positive terminal of said second comparator is supplied with a programmable voltage and coupled to a resistor, wherein a programmable current flows through said resistor to generate said programmable voltage;

a first D-type flip-flop, coupled to output terminals of said inverter and said first comparator and a voltage source, said first D-type flip flop further comprising an output;

a second D-type flip-flop, coupled to output terminals of said inverter and said second comparator and said voltage source, said second D-type flip-flip further comprising an output;

a third D-type flip-flop, coupled to said output terminal of said inverter, said third D-type flip-flop having a first output and a second output, wherein said second output of said third D-type flip-flop is inverted from said first output of said third D-type flip-flop;

a first AND gate, coupled to outputs of said first D-type flip-flop and said inverter, and said first output of said third D-type flip-flop; and a second AND gate, coupled to outputs of said second D-type flip-flop and said inverter, and said second output of said third D-type flip-flop.

3. The pulse width modulated soft-switching power converter as recited in claim 2, wherein said first AND gate is operative to generate said first switching signal to drive said main switches, and said second AND gate is operative to generate said second switching signal to drive said auxiliary switches.

4. The pulse width modulated soft-switching power converter as recited in claim 2, wherein said resistor connected to said positive terminal of said second comparator is used to adjust a pulse width of said second switching signal.

5. The pulse width modulated soft-switching power converter as recited in claim 2, further comprising a programmable current source to generate said programmable current, wherein said programmable current is adjusted in response to said feedback voltage.

6. The pulse width modulated soft-switching power converter as recited in claim 5, wherein said programmable current source further comprises:

a constant current source;

a pair of mirrored transistors, connected to said constant current source;

a transistor, coupled to one of said mirrored transistors;

a first op-amplifier, coupled between said transistor and said feedback voltage;

a programmable resistor, coupled to said transistor and said first op-amplifier; and a second op-amplifier, coupled to said programmable resistor and a threshold voltage.

7. The pulse width modulated soft-switching power converter as recited in claim 5, wherein said programmable resistor is adjustable for determining the variation range of said programmable current programmed by said feedback voltage.

8. The pulse width modulated soft-switching power converter as recited in claim 5, wherein said programmable current source generating said programmable current, wherein said programmable current is proportional to a mirror ratio of the pair of mirrored transistors and the difference between said feedback voltage and said threshold voltage, and inversely proportional to the resistance of said programmable resistor.

* * * * *